(12) United States Patent
Theunissen et al.

(10) Patent No.: US 10,045,407 B1
(45) Date of Patent: Aug. 7, 2018

(54) DUAL INPUT VOLTAGE CONSTANT POWER INDICATOR

(71) Applicant: Banner Engineering Corp., Plymouth, MN (US)

(72) Inventors: William Theunissen, Maple Grove, MN (US); Bob Schlosser, New Hope, MN (US)

(73) Assignee: Banner Engineering Corp., Plymouth, MN (US)

( * ) Notice: Subject to any disclaimer, the term of this patent is extended or adjusted under 35 U.S.C. 154(b) by 0 days.

(21) Appl. No.: 15/458,705

(22) Filed: Mar. 14, 2017

(51) Int. Cl.
*H05B 33/08* (2006.01)
*H05B 37/02* (2006.01)

(52) U.S. Cl.
CPC ..... *H05B 33/0812* (2013.01); *H05B 33/0845* (2013.01); *H05B 37/02* (2013.01)

(58) Field of Classification Search
CPC combination set(s) only.
See application file for complete search history.

(56) References Cited

U.S. PATENT DOCUMENTS

| | | | |
|---|---|---|---|
| 8,247,998 B2 | 8/2012 | Hum et al. | |
| 8,525,952 B2 | 9/2013 | Tanaka et al. | |
| 8,648,539 B2 | 2/2014 | Miskin et al. | |
| 2005/0248322 A1* | 11/2005 | Kagemoto | H05B 33/0815 323/220 |
| 2008/0019142 A1 | 1/2008 | Rapeanu et al. | |
| 2009/0187925 A1* | 7/2009 | Hu | H05B 33/0815 719/327 |
| 2014/0153232 A1 | 6/2014 | Miskin et al. | |
| 2016/0150610 A1* | 5/2016 | Hsu | H05B 33/083 315/191 |

* cited by examiner

*Primary Examiner* — Monica C King
*Assistant Examiner* — Jianzi Chen
(74) *Attorney, Agent, or Firm* — Craige Thompson; Thompson Patent Law (57) ABSTRACT

Apparatus and associated methods relate to a dual-input voltage range compatible light adapted to reconfigure two light elements in series or in parallel and make corresponding current limit adaptations, in response to the input voltage entering one of two predetermined ranges. In an illustrative example, the lighting elements may be strings of LEDs. The current limit may be regulated, for example, by two linear current regulators. In various examples, the current through each of the light elements may be maintained at a predetermined current level independent of the input voltage range. A network of switches may reconfigure current paths among the light elements and the current regulators, for example, in response to the voltage range detected by a control module. The current limit adaptations may advantageously maintain power dissipation of the linear current regulators at a reduced level across a wide input voltage range, and without generating substantial electromagnetic interference.

23 Claims, 6 Drawing Sheets

DUAL INPUT VOLTAGE CONSTANT POWER INDICATOR

TECHNICAL FIELD

Various embodiments relate generally to power supplies for lighting fixtures.

BACKGROUND

Illumination is the employment of light to reach a practical or aesthetic goal. Illumination may include the use of artificial light sources, for example lamps, luminaires and light fixtures. The employment of adequate lighting, indoor or outdoor, may promote eye health, job efficiency, safety, provide indication, signage, alerts, change aesthetics, or may promote a desired mood.

The advent of white light-emitting diodes (LEDs) has changed the landscape of illumination. One or more LEDs may be placed into conventional light bulbs or lighting fixtures to provide longer fixture lifespans and higher electrical efficiency. LEDs have efficiencies several times greater than incandescent lamps, and may even be more efficient than fluorescent lamps.

Industrial and commercial luminaires may employ LEDs in their design, receiving the benefits of LED lighting as described above. A luminaire provides lighting with a safe electrical connection, allows for appropriate installation due to its compact size, and may enhance aesthetics. Luminaires come in many shapes and sizes because humans employ them in so many ways. Home or commercial settings may find beneficial employment of luminaries in place of incandescent or fluorescent fixtures, for example under cupboards to provide a warm ambience to a counter top. Industry may employ individual luminaires for employees on a manufacturing floor, for example. Restaurants or other entertainment venues may find benefit in employment of luminaires to enhance their brand or to attract customers, for example pendant fixtures and track lighting.

SUMMARY

Apparatus and associated methods relate to a dual-input voltage range compatible light adapted to reconfigure two light elements in series or in parallel and make corresponding current limit adaptations, in response to the input voltage residing in one of two predetermined ranges. In an illustrative example, the lighting elements may be strings of LEDs. The current limit may be regulated, for example, by two linear current regulators. In various examples, the current through each of the light elements may be maintained at a predetermined current level independent of the input voltage range. A network of switches may reconfigure current paths among the light elements and the current regulators, for example, in response to the voltage range detected by a control module. The current limit adaptations may advantageously maintain the power dissipation of the linear current regulators to a reduced level across a wide input voltage range, and without generating substantial electromagnetic interference.

Various embodiments may achieve one or more advantages. For example, some embodiments may operate properly and efficiently at more than one input voltage such as 12 V or 24 V. Due to the linear control circuit and switching network, some embodiments may operate with reduced power without the use of switching power regulators (switch mode power supplies), and may therefore benefit from substantially reduced electromagnetic interference (EMI).

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, an exemplary use case of a linear dual-voltage-capable area lighting device (LDVALD), and overall functional block diagram is briefly introduced with reference to FIG. 1. Second, with reference to FIG. 2A-2B, the discussion turns to exemplary LDVALD embodiments that illustrate two specific switching configurations, specifically, LED channels or strings in parallel and in series. LDVALD power dissipation is then illustrated in FIG. 3A and 3B, with respect to the LDVALD input voltage. In FIG. 4, a functional block diagram of an exemplary embodiment, is presented to illustrate basic circuit operation. Finally, with reference to FIG. 5A and 5B, a detailed schematic of an exemplary embodiment is presented to illustrate actual circuit implementation.

Figure 1:
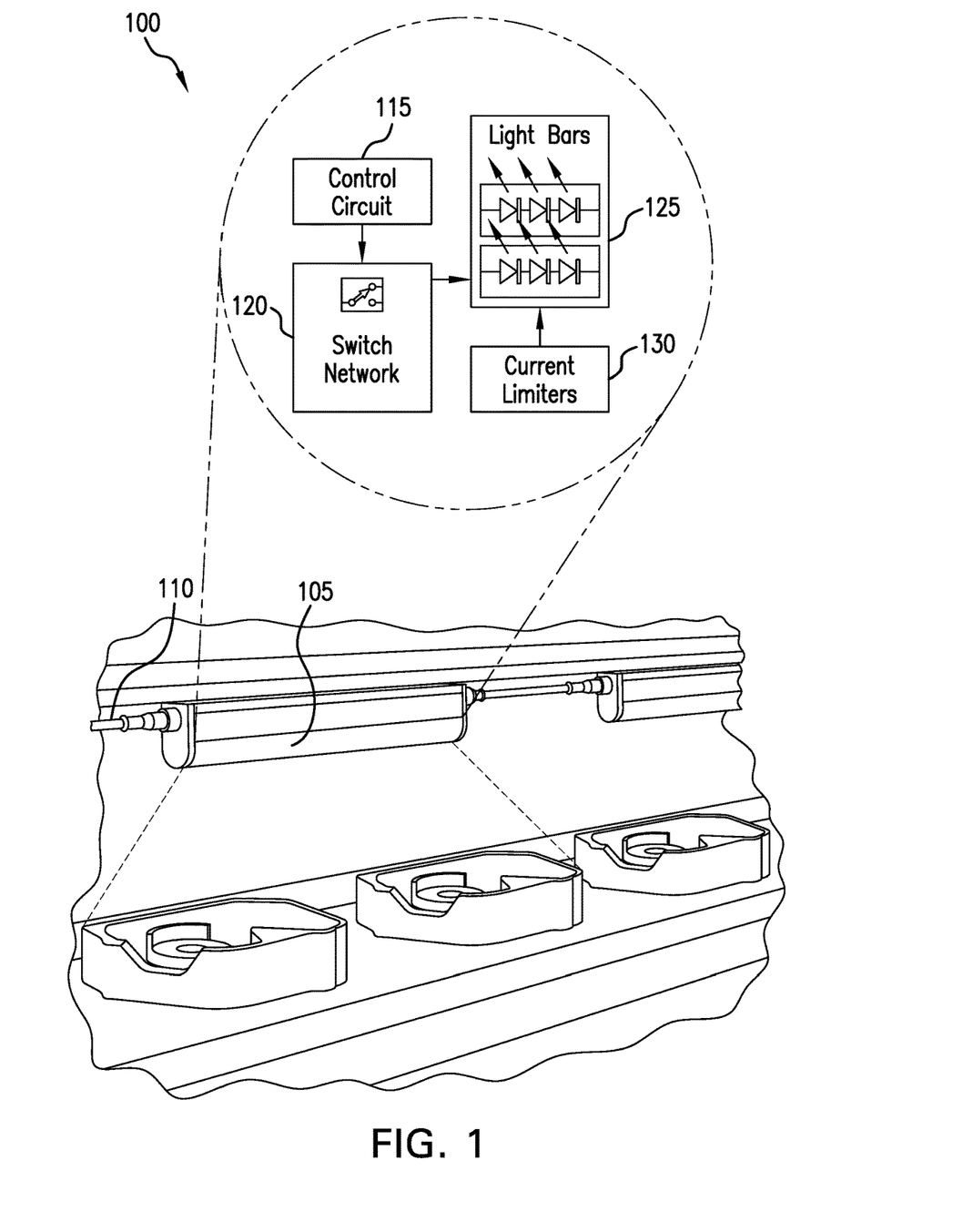
FIG. 1 depicts a perspective view of an exemplary linear dual-voltage-capable area lighting device (LDVALD) in a manufacturing environment.

FIG. 1 depicts a perspective view of an exemplary LDVALD in a manufacturing environment. An environment lit by an exemplary LDVALD 100, includes a luminaire 105. The luminaire 105 is powered by factory power, via a power harness and connector 110. The power harness and connector 110 power a control circuit 115 housed within the luminaire 105. The control circuit 115 controls a switched network 120. The switched network 120 configures the connection of one or more lighting elements 125, which may be, by way of example and not limitation, LED light bars, LED light strings, or LED channels. The lighting elements 125 are brightness controlled by one or more current limit circuits 130. In some examples, the small size of the luminaire 105 may advantageously fit into small spaces, for example in a manufacturing assembly line. In some examples the higher voltage supply in a factory, may operably cause the luminaire 105 to configure its lighting elements in a series configuration and its current limiters into a lower current regulation range. In some embodiments, the luminaire 105 may advantageously and automatically adjust the luminaire 105 input power to substantially maintain overall power and overall brightness consistency over a wide input voltage source range.

In some examples, the input voltage range may be at least double a lower nominal voltage. For example, a 12 V nominal input source voltage and a 24 V nominal input source voltage may be considered to span a wide input voltage source range, for example, from about 0 V to at least about 30 V, such as for example, between about 3 V and about 30 V, about 9 V and about 28 V, or about 10 V to about 24 V+/−20%.

Figure 2A:
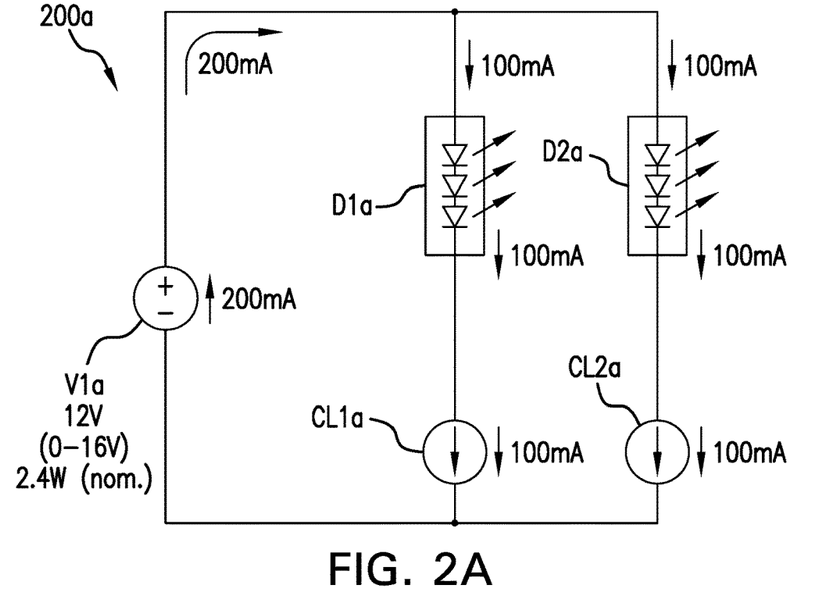
FIG. 2A depicts a schematic view of an exemplary LDVALD in a parallel, low-voltage range configuration.

FIG. 2A depicts a schematic view of an exemplary LDVALD in a parallel, low-voltage range configuration. An area light source 200a circuit configured for lower voltage includes a voltage source V1a. The voltage source V1a provides current to two LED strings D1a and D2a, configured in parallel. The LED string D1a is current-controlled by a dedicated current limiter CL1a. The LED string D2a is current-controlled by a dedicated current limiter CL2a.

Figure 2B:
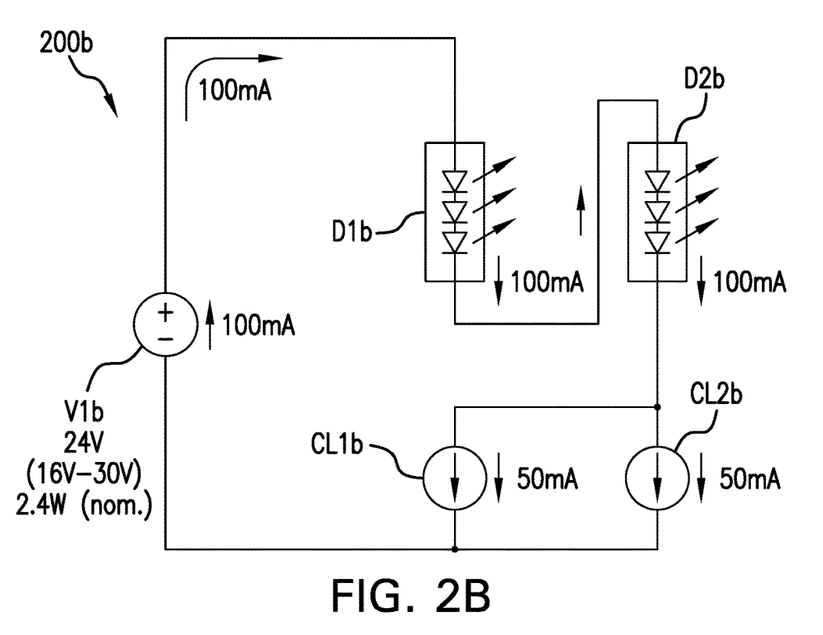
FIG. 2B depicts a schematic view of an exemplary LDVALD in a series high voltage range configuration.

FIG. 2B depicts a schematic view of an exemplary LDVALD in a series high voltage range configuration. An area light source 200b circuit configured for higher voltage includes a voltage source V1b. The voltage source V1b provides current to two LED strings D1b and D2b connected in series. The LED strings D1b and D2b connected in series are current controlled by the parallel combination of CL1b and CL2b.

Figure 3:
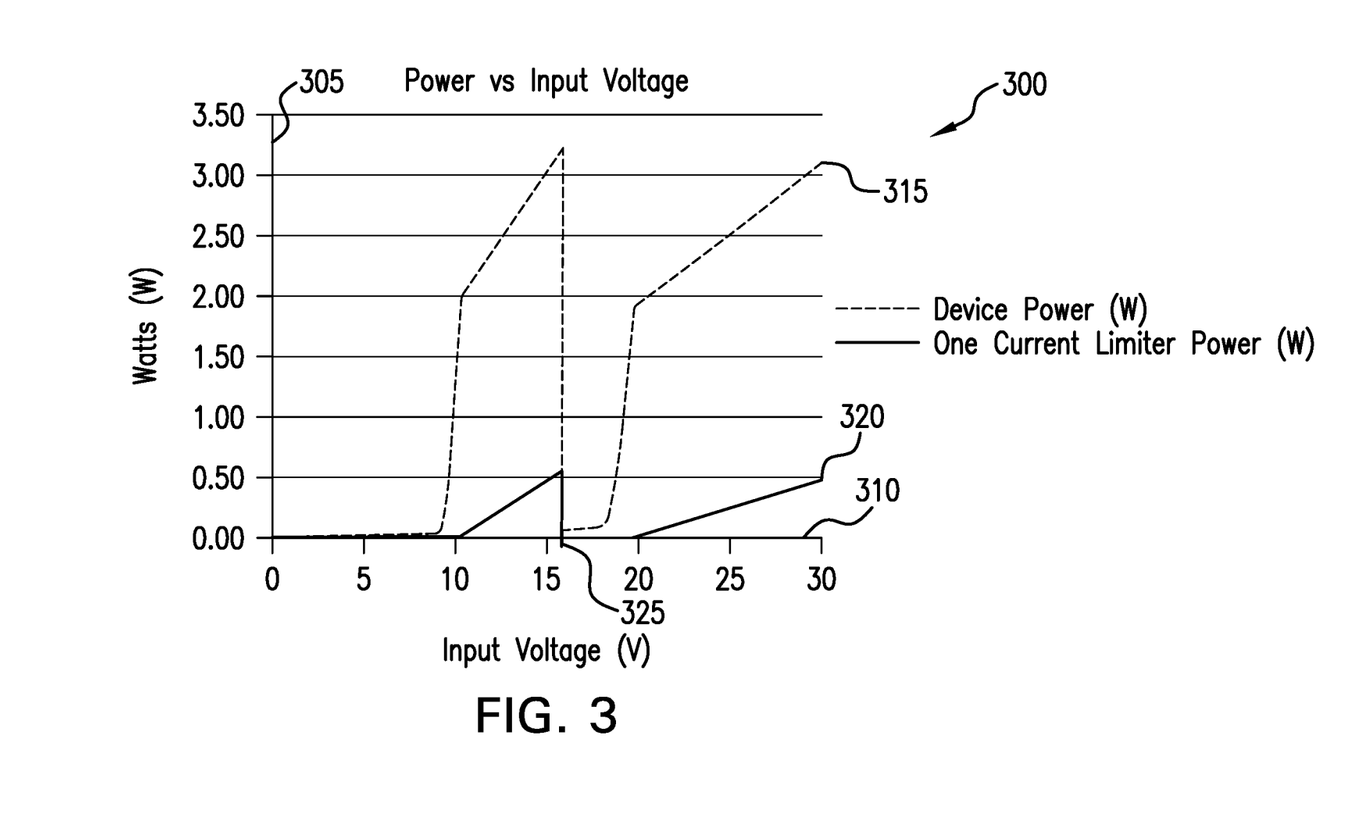
FIG. 3 depicts a graph of power dissipation over a wide input voltage range for an exemplary LDVALD.
Figure 4:
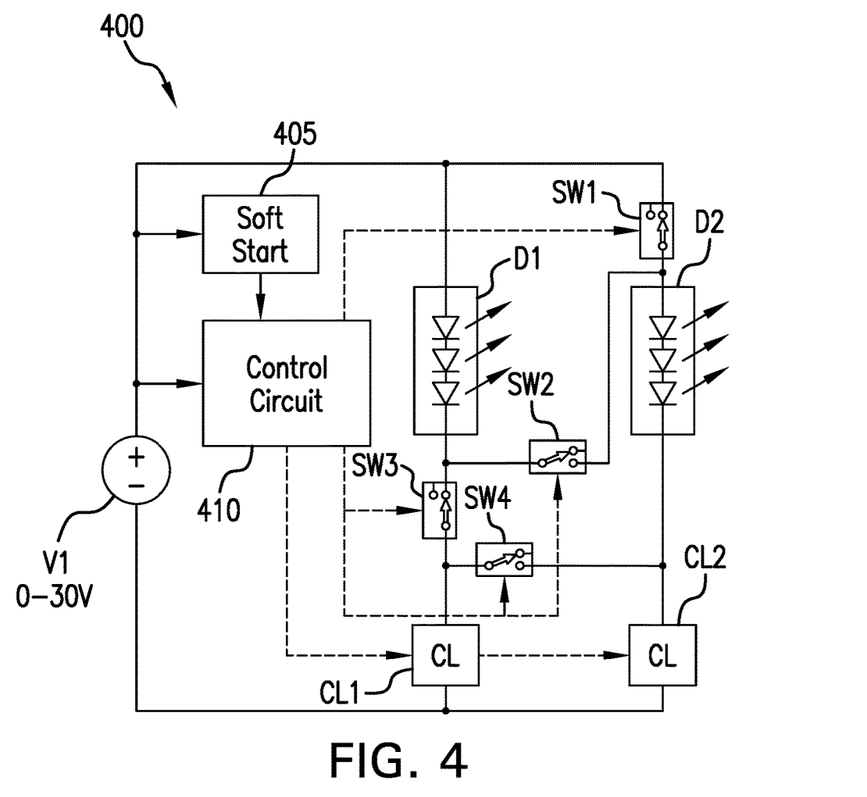
FIG. 4 depicts a block diagram of an exemplary LDVALD illustrating switching networks.

FIG. 3 depicts a graph of power dissipation over a wide input voltage range for an exemplary LDVALD. In the depicted graph 300, according to a circuit simulation, power dissipation is shown along a vertical axis 305 as a function of input voltage along a horizontal axis 310. A first plot 315 illustrates the power dissipation of an exemplary LDVALD over a range of 30 V, where the lower and upper nominal voltages are at about 12 V and about 24 V, respectively. A second plot 320 illustrates the power dissipation in either one of the two current regulators, which may be the current limiters 130 of FIG. 1.

The plots 315, 320 indicate a sharp decrease in power dissipation as the input voltage sweeps up and crosses a transition threshold 325. In the depicted example, the transition threshold is at about 15 V, which is between the upper and lower nominal voltages.

Sweeping up from 0 to 30 V along the input voltage axis 310, the power dissipation of the entire LVDALD, as shown in the plot 315, is substantially near zero until sufficient input voltage is applied to drive the LED strings substantially into a forward conduction operating region (e.g., by overcoming the combined forward voltage drop of all the LEDs in the LED string). In the depicted example, the plot 315 rises sharply as the LED strings start to conduct at about 8-9 V. Once the current limiters establish a maximum current through the LED strings, the increased voltage, below the transition threshold 325, produces increased power dissipation in each of the current limiters. Advantageously, the LED current level being substantially regulated may yield a substantially constant brightness output.

Continuing to sweep up along the input voltage axis 310, the power dissipation in each of the current regulators is substantially near zero above the transition threshold 325, as the reconfiguration of the LED strings in series causes the current to be minimal until the input voltage rises to about 17 V in order to start to conduct substantial forward current in the series combined LED strings. The behavior of power dissipation in the LED strings and each of the current regulators is substantially similar in the voltage range above and below the transition threshold 325. However, a slope of the power dissipation in the lower range on the plot 320 is twice that of the slope of the power dissipation in the upper range, as the increased input voltage may be absorbed evenly by each of the current regulators while they are configured in series in the upper voltage range.

FIG. 4 depicts a block diagram of an exemplary LDVALD illustrating switching networks. An LDVALD system 400, is powered by an input power supply V1. V1 powers a soft-start circuit 405. The soft-start circuit 405 provides signals that allow elegant startup of a control circuit 410. The control circuit 410 provides logic signals to control the current limiters CL1 and CL2. The control circuit 410 also provides logic signals to control switches SW1, SW2, SW3 and SW4. The switches SW1-SW4 provide the switching to configure LED strings D1 and D2, into a parallel connected circuit, or a series connected circuit.

In some embodiments, at low range input voltages, below about 16 V, the control circuit 410 configures the LED strings D1 and D2, into a parallel configuration, by closing SW1 and SW3, and opening SW2 and SW4. In this configuration, the control circuit 410 also places CL1 and CL2 into a predetermined high-current setting.

In some embodiments at high range input voltages, above about 16 V, the control circuit 410 configures the LED strings D1 and D2 into a series configuration, by opening SW1 an SW3 and closing SW2 and SW4. In this configuration, the control circuit 410 also places CL1 and CL2 into a predetermined low-level current setting.

Figure 5A:
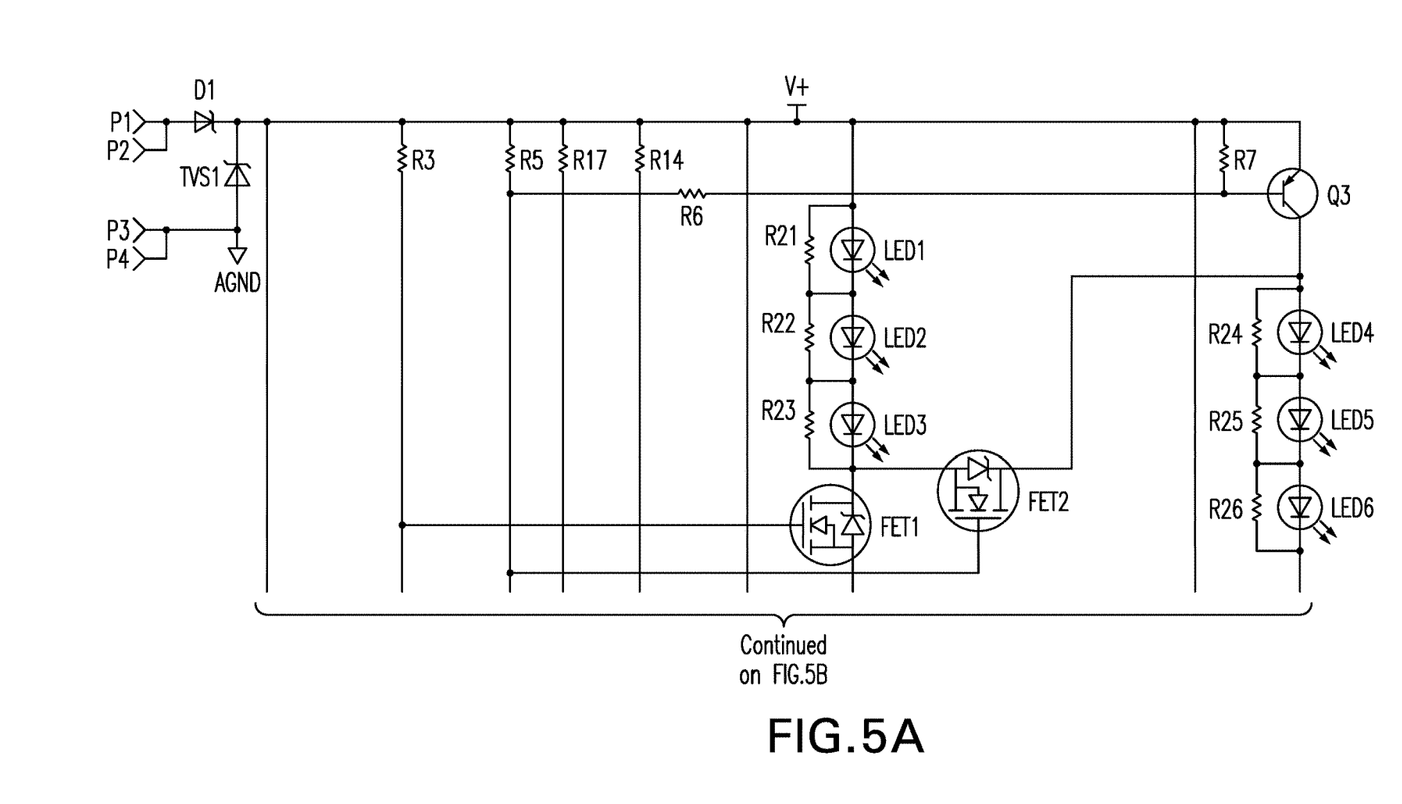
FIG. 5A in conjunction with FIG. 5B depicts a circuit schematic of an exemplary LDVALD.
Figure 5B:
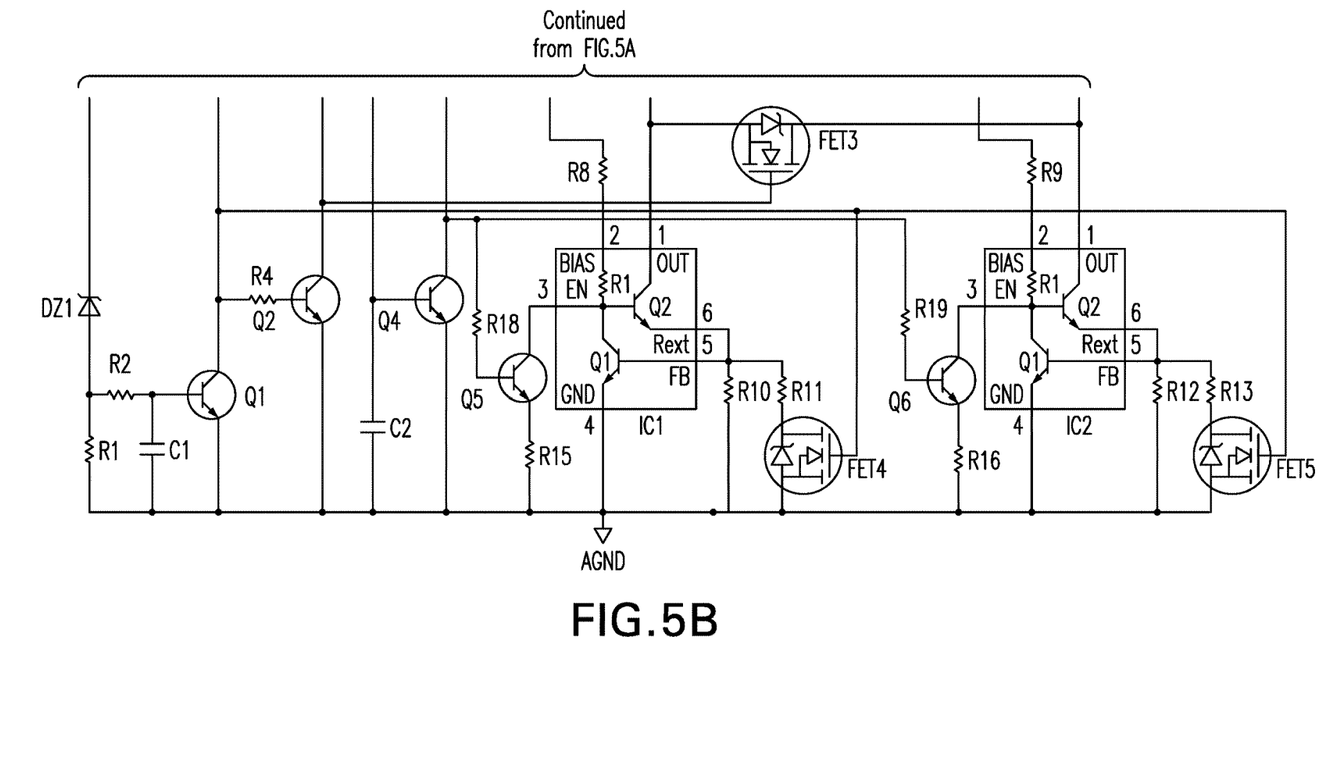

FIG. 5A in conjunction with 5B depicts an exemplary circuit schematic of a LDVALD. Diode D1 provides reverse input power protection. Diode TVS1 provides transient voltage suppression. Diode DZ1 in conjunction with resistor R1 provide the input voltage predetermined switching threshold. Transistors Q1, Q2, and Q4 provide the logic switching. Transistors FET1, FET2, FET3 and Q3 provide the circuit configuration switching. Integrated circuits IC1 and IC2 are current limiters. Resistors R10, R11, R12 and R13 provide the predetermined current limiting setpoints. Transistors FET4 and FET5 provide the current setpoint switching. An LED triad LED1-LED2-LED3, and an LED triad LED4-LED5-LED6 make up the two lighting elements, also known as the light strings. Q4 switches in and out the soft-start feature. Transistor Q4 enables and disables current limiters IC1 an IC2, (turns on and off the LEDs) during the soft start. Upon application of power to the input terminals, transistor Q4 is controlled by the time constant set up from C2 and R17. In some embodiments, during start up, the lights remain off until the final input voltage is reached, and the logic switching is final. All other resistors and capacitors are employed to provide biasing.

In some embodiments, during operation at 12 V, the circuit is configured such that two LED chains; LED1-3 may be in series in one chain, and LED4-6 may be in series in another chain. Transistors FET1 and Q3 may be on, and transistors FET2 and FET3 may be off. IC1 may be the LED driver that maintains constant current through LED1-3 and IC2 may be the LED driver that maintains constant current through LED4-6. Each LED driver may be set to employ a nominal LED current of about 70 mA by turning transistor FET4 and FET5 on. The overall device current may be approximately determined by adding the two LED currents together to get about 140 mA. The secondary circuit that reconfigures the circuit draws only a few milliamps and may be neglected for this explanation. Therefore, the device power may be 140 mA×12 V=1.68 Watts.

In some embodiments, during operation at 24 V, the circuit may be configured such that one LED chain; LED1-3 may be in series with LED4-6. Transistors FET1 and Q3 may be off, and transistors FET2 and FET3 may be on. LED driver IC1 and IC2 split the LED current. The LED chain may be set to have a nominal LED current of about 70 mA; and IC1 and IC2 each may be configured for 35 mA by turning transistor FET4 and FET5 off. The overall device current may be about the same as the current going through the LED chain. Therefore, the device power may be 70 mA×24 V=1.68 Watts.

In some embodiments, the predetermined input voltage transition point may be set around 16 V. Once the input voltage reaches 16 V or above, the voltage monitoring circuit, made up of Zener diode DZ1 and resistor R1, may start conducting which may flip the logic states of transistors Q1 and Q2. Q1 and Q2 may act as the logic for the configuration of the transistors in-line with the LEDs mentioned in the paragraphs above. Q1 and Q2 may always be at different logic states.

In some examples when facility-provided power supplies start up, their output voltage may ramp the output voltage up, over the course of milliseconds. Since in some embodiments the LDVALD circuit is designed to work at both a high and low input voltage, for example both 12 V and 24 V, the light may turn on with the circuit configured in the low voltage parallel configuration, as the input voltage may be continuing to ramp up past 12 V. The LDVALD may then reconfigure itself as the input voltage eventually settles at 24 V. the situation may be perceived as a startup flash, or a latch up situation. In some examples, a soft-start circuit may delay the light from turning on immediately upon input power application. The soft-start circuit delay may advantageously provide predictable cold-start operation and may advantageously delay the light from turning on until the 24 V output voltage has reached a steady-state.

In some embodiments, the soft-start circuit may be Q4-Q6, C2, R14-R19. When input power is applied to the LDVALD, Q4 may be off, which may mean that Q5 and Q6 are on, and may be pulling pin 3 of the LED driver ICs low, which may disable them, so no substantial current may flow through the LEDs. Q4 may remain off until C2 charges up to turn on Q4, which may then turn Q5 and Q6 off, which may allow the LED drivers to conduct current through the LEDs.

In some examples, resistors R21-R26 in parallel with each LED may shunt stray leakage current away from the LEDs that may cause faint flickering of the LEDs. The transistors used to reconfigure the LED chain may provide a leakage path for current when they are off or transitioning between on and off states.

Although various embodiments have been described with reference to the FIGS., other embodiments are possible. For example, a small percentage of positive feedback may be employed within the logic switching transistor circuits Q1, Q2 and Q4 to provide hysteresis on the input voltage signal, which may advantageously provide flicker-free operation at or near the input voltage predetermined threshold. In some embodiments, the current limiting circuit may be implemented as a source, or as a sink.

In some embodiments, the LDVALD circuit provides a 2-wire power and control system to a luminaire device. The power to the luminaire device may also provide the logic necessary to reconfigure the circuit to operate efficiently at both high and low voltage inputs.

In some examples, the LDVALD may be provided with various colored LEDs. The various colors may provide the user with additional information, for example red may mean warning, or stop. In some embodiments, the user may use the colors for indicators. Other color implementations are contemplated. In some examples the LDVALD may employ more than one color. Some embodiments the LDVALD may employ one or more RGB LEDs. The RGB LEDs may be individually pulse width modulated for each diode in order to calibrate it. In some embodiments, the LDVALD may employ three separate red, green, and blue LEDs to implement the RGB functions.

In some embodiments, the efficacy of the luminaire; the lumens per watt (L/W), may remain substantially efficient and consistent at more than one input voltage such as 12 V or 24 V.

In some examples, the LDVALD circuit may be adjusted to work with many different nominal input voltages, for example 48 V and 60 V. In some examples the input voltage may be alternating current (AC), the input voltage may be rectified internal to the LDVALD, for example 120 VAC and 240 VAC. In some embodiments, line voltages from various countries may be employed, for example 100 VAC and 220 VAC.

In some examples, the LDVALD may be dimmed by pulse width modulating (PWM) the input power. This may be done with a programmable logic controller (PLC), for example. In these examples, the frequency may be at a frequency the human eye may not detect, for example 300 Hz. The duty cycle of the PWM waveform may be from 0 to 100%, to go from dark to substantially full brightness.

In some examples the circuit configuration switches may be a transistor or some other switching device for directing the current. Transistors switching devices for directing the current may include MOSFETs, IGBTs, solid-state switches, bilateral switches, or optocoupler switches, for example. Electromechanical switches for directing the current may include relays, or reed switches, for example. In some examples the LDVALD may employ manual switching, and may provide an external slide switch for the installer to configure the input voltage range.

In some embodiments, digital logic integrated circuits may perform the control circuit function. In some examples a microcontroller or a PIC, executing a predetermined programmed sequence may be employed to read the input voltage, and to control the switching network.

In an illustrative example the dual input voltage constant power linear LED driver may maintain the same current through the LEDs and substantially the same overall device power at two different nominal input voltages. This may be accomplished by reconfiguring the amount of LED chains and the number of LEDs in series in a chain with switches, such as transistors. The reconfiguration may be triggered by a secondary circuit that monitors the input voltage and then may activate at a voltage in-between the two different input voltages.

In some embodiments, the LDVALD may advantageously allow a substantially large input voltage range without damaging the light sources at high voltage, and without substantial dimming at low voltages, employed without high-speed switching circuitry which may produce electromagnetic interference (EMI).

In some embodiments, the LDVALD may relate to an area lighting device powered by an input source voltage, which may include, a pair of LED strings, a switching network with several switches, a linear control circuit, with one or more predetermined ranges, and a pair of current limiting circuits, each with one or more predetermined current limits. The LED strings may be configured by the switching network, which may be controlled by a linear control circuit, which may configure the LED strings in series or in parallel, in response to an input source voltage within one or more predetermined ranges. The current limiters may also be configured by the switching network, which may configure the current limiters to one or more predetermined current limits in response to the input source voltage within one or more predetermined ranges. In an illustrative example, the area lighting device may advantageously reduce bill of materials parts count for manufacture.

In some embodiments, the LDVALD may employ linear circuits, rather than switch mode circuits. Switch mode circuits, employ circuit elements in their saturated regions, which dissipates less power, but may emit electromagnetic interference (EMI). For example, a transistor regulating current in a switch mode, may rapidly turn a circuit element all the way on, or all the way off, while regulating a high current. Since current flows only when the switch is on, and the voltage across the switch is nearly zero, very little power may be dissipated. In contrast, linear circuits employ circuit elements in their active regions, which may dissipate more power, but may emit no EMI. For example, a transistor regulating current in a linear mode, may stand off a high voltage, while regulating a high current, and therefore dissipating high-power.

In various implementations, the input electrical power and light output may be substantially consistent at each of two or more predetermined voltage ranges. For some embodiments, an upper nominal voltage in an upper voltage range may be approximately double a lower nominal voltage in a lower voltage range.

In some embodiments, an upper nominal voltage may be substantially less than double the lower nominal voltage range. In an illustrative example, a pair of LED strings may operate in parallel around a 48 V nominal operating input voltage. In a second, higher voltage range, which may have a 60 V nominal operating input voltage, for example, a portion of the LEDs in the first and second LED strings may be reconfigured in a series relationship suitable for substantially maintaining a consistent brightness level at each voltage range. In this example, a portion of the LEDs in the first and second strings of LEDs may be bypassed such that they do not conduct a forward current. The operating current level may be appropriately predetermined for both configurations such that the luminaire outputs a substantially consistent light level in each voltage range. In such an embodiment, a switching network may include a bypass switch to bypass one or more LEDs in order to ensure forward current conduction of the series connected strings in the upper voltage range.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components, or if the LEDs were replaced by LEDs of different colors, different efficiencies, different dispersion patterns or different intensities. Accordingly, other implementations are contemplated within the scope of the following claims.

What is claimed is:

1. An apparatus to manage power dissipation in a linear mode area indicating device subject to multiple supply voltage levels, the apparatus comprising:
   a supply input terminal operable to receive operating load current at a supply node;
   a return input terminal operable to return the operating load current from a return node;
   a first lighting element;
   a second lighting element;
   a first current regulator configured to operate in a linear mode;
   a second current regulator configured to operate in a linear mode;
   a soft start module operably coupled to disable the first and the second current regulators for a predetermined time period after an electrical supply of power is applied to the first and second terminals; and,
   a voltage-responsive controller circuit (VRCC) operably coupled to monitor a supply voltage defined between the supply node and the return node, and further operably coupled to directly control the first and second regulators between a first mode and a second mode,
   wherein, in response to the supply voltage exceeding a predetermined threshold, the VRCC enters the second mode, and in response to the supply voltage being below the predetermined threshold, the VRCC enters the first mode,
   wherein, in the first mode, the first current regulator and the second current regulator are each controlled by the VRCC to limit the current in the first lighting element and the second lighting element, respectively, to a predetermined current level, the first current regulator regulates the predetermined current level in the first lighting element through a first circuit branch, the second current regulator regulates the predetermined current level in the second lighting element through a second circuit branch, and the first and second circuit branches are in parallel, and,
   wherein, in the second mode, the first current regulator and the second current regulator are each controlled by the VRCC to limit the current in the first lighting element and the second lighting element, respectively, to the predetermined current level, the predetermined current level flows through the first lighting element connected in series with the second lighting element, and the predetermined current level splits to flow through the first current regulator and the second current regulator connected in parallel.

2. The apparatus of claim 1, further comprising a direct electrical path for current between the second lighting element and the second regulator in both the first mode and the second mode.

3. The apparatus of claim 2, further comprising a first switch module operably controlled by the VRCC, wherein in the first mode, the first switch module provides a current path from the supply node to the second lighting element.

4. The apparatus of claim 3, further comprising a second switch module operably controlled by the VRCC, wherein in the first mode, the second switch module provides a first current path from the supply node to the first current regulator, the first current path passing through the first lighting element.

5. The apparatus of claim 4, wherein, in the first mode, the first lighting element and the first current regulator are in parallel with the second lighting element and the second current regulator.

6. The apparatus of claim 4, wherein the second switch module is responsive to the VRCC to couple the first lighting element in series with the second lighting element in the second mode.

7. The apparatus of claim 6, wherein the second switch module is further configured to bypass at least one of a number of LEDs in at least one of the first and the second lighting elements in the second mode, wherein the LEDs that are bypassed in the second mode emit substantially no light while they are bypassed by the second switch module, and the LEDs that are bypassed in the second mode are operable to emit light in the first mode.

8. The apparatus of claim 1, wherein the VRCC is configured to command the first regulator and the second current regulator to carry equal portions of the predetermined current when in the second mode.

9. The apparatus of claim 8, wherein the first nominal voltage is about 12 Volts, and the second nominal voltage is about 24 Volts.

10. The apparatus of claim 1, wherein the first mode corresponds to a voltage range about a first nominal supply voltage, the second mode corresponds to a voltage range about a second nominal supply voltage, and the VRCC is operable to transition between the first and second modes at a transition voltage between the first nominal supply voltage and the second nominal supply voltage.

11. The apparatus of claim 1, wherein the VRCC operates without feedback from either the first second current regulator or the second current regulator.

12. An apparatus to manage power dissipation in a linear mode area indicating device subject to multiple supply voltage levels, the apparatus comprising:
 a supply input terminal operable to receive operating load current at a supply node;
 a return input terminal operable to return the operating load current from a return node;
 a first lighting element;
 a second lighting element;
 a first current regulator configured to operate in a linear mode;
 a second current regulator configured to operate in a linear mode; and,
 a voltage-responsive controller circuit (VRCC) operably coupled to monitor a supply voltage defined between the supply node and the return node, and further operably coupled to control the first and second current regulators between a first mode and a second mode,
 wherein, in response to the supply voltage exceeding a predetermined threshold, the VRCC enters the second mode, and in response to the supply voltage being below the predetermined threshold, the VRCC enters the first mode,
 wherein, in the first mode, the first current regulator and the second current regulator are each controlled by the VRCC to limit the current in the first lighting element and the second lighting element, respectively, to a predetermined current level, the first current regulator regulates the predetermined current level in the first lighting element through a first circuit branch, the second current regulator regulates the predetermined current level in the second lighting element through a second circuit branch, and the first and second circuit branches are in parallel, and,
 wherein, in the second mode, the first current regulator and the second current regulator are each controlled by the VRCC to limit the current in the first lighting element and the second lighting element, respectively, to the predetermined current level, the predetermined current level flows through the first lighting element connected in series with the second lighting element, and the predetermined current level splits to flow through the first current regulator and the second current regulator connected in parallel.

13. The apparatus of claim 12, further comprising a direct electrical path for current between the second lighting element and the second regulator in both the first mode and the second mode.

14. The apparatus of claim 13, further comprising a first switch module operably controlled by the VRCC, wherein in the first mode, the first switch module provides a current path from the supply node to the second lighting element.

15. The apparatus of claim 14, further comprising a second switch module operably controlled by the VRCC, wherein in the first mode, the second switch module provides a first current path from the supply node to the first current regulator, the first current path passing through the first lighting element.

16. The apparatus of claim 15, wherein the second switch module is responsive to the VRCC to couple the first lighting element in series with the second lighting element in the second mode.

17. The apparatus of claim 15, wherein, in the first mode, the first lighting element and the first current regulator are in parallel with the second lighting element and the second current regulator.

18. The apparatus of claim 12, wherein the VRCC is configured to command the first regulator and the second regulator to carry equal portions of the predetermined current when in the second mode.

19. The apparatus of claim 12, wherein the VRCC operates without feedback from either the first second current regulator or the second current regulator.

20. An apparatus to manage power dissipation in a linear mode area indicating device subject to multiple supply voltage levels, the apparatus comprising:
 a supply input terminal operable to receive operating load current at a supply node;
 a return input terminal operable to return the operating load current from a return node;
 a first lighting element;
 a second lighting element;
 a first current regulator configured to operate in a linear mode;
 a second current regulator configured to operate in a linear mode;
 a voltage-responsive controller circuit (VRCC) operably coupled to monitor a supply voltage defined between the supply node and the return node, and further operably coupled to control the first and second current regulators between a first mode and a second mode; and,
 switching means for directing the current through the first lighting element, the second lighting element, the first current regulator and the second current regulator in response to the VRCC,
 wherein, in response to the supply voltage exceeding a predetermined threshold, the VRCC enters the second mode, and in response to the supply voltage being below the predetermined threshold, the VRCC enters the first mode,
 wherein, in the first mode, the first current regulator and the second current regulator are each controlled by the VRCC to limit the current in the first lighting element and the second lighting element, respectively, to a predetermined current level, wherein the first current regulator regulates the predetermined current level in the first lighting element through a first circuit branch, the second current regulator regulates the predetermined current level in the second lighting element through a second circuit branch, and the first and second circuit branches are in parallel, and,
 wherein, in the second mode, the first current regulator and the second current regulator are each controlled by the VRCC to limit the current in the first lighting element and the second lighting element, respectively, to the predetermined current level, the predetermined current level flows through the first lighting element connected in series with the second lighting element, and the predetermined current level splits to flow through the first current regulator and the second current regulator connected in parallel.

21. The apparatus of claim 20, wherein the switching means configures the first lighting element and the second lighting element in parallel in the first mode.

22. The apparatus of claim 20, wherein the switching means configures the first lighting element and the second lighting element in series in the second mode.

23. The apparatus of claim 20, wherein the VRCC operates without feedback from either the first second current regulator or the second current regulator.

\* \* \* \* \*